(12) United States Patent
Takahama et al.

(10) Patent No.: US 11,506,524 B2
(45) Date of Patent: Nov. 22, 2022

(54) ELEVATOR ENCODER DIAGNOSTIC SYSTEM AND DIAGNOSTIC METHOD

(71) Applicant: FUJITEC CO., LTD., Hikone (JP)

(72) Inventors: Tsutomu Takahama, Hikone (JP); Shunpei Yamaoka, Hikone (JP); Ryosuke Matsui, Hikone (JP)

(73) Assignee: FUJITEC CO., LTD., Shiga (JP)

( * ) Notice: Subject to any disclaimer, the term of this patent is extended or adjusted under 35 U.S.C. 154(b) by 121 days.

(21) Appl. No.: 16/594,258

(22) Filed: Oct. 7, 2019

(65) Prior Publication Data

US 2021/0025739 A1 Jan. 28, 2021

(51) Int. Cl.
*G01D 18/00* (2006.01)
*B66B 5/00* (2006.01)

(52) U.S. Cl.
CPC ........... *G01D 18/00* (2013.01); *B66B 5/0087* (2013.01)

(58) Field of Classification Search
None
See application file for complete search history.

(56) References Cited

U.S. PATENT DOCUMENTS

| | | | | |
|---|---|---|---|---|
| 2009/0072130 A1* | 3/2009 | Chase | ................... | G01D 5/3473 250/231.14 |
| 2009/0120729 A1* | 5/2009 | Okamoto | ................ | B66B 7/027 187/394 |
| 2011/0202308 A1* | 8/2011 | Kishida | ................... | G01B 7/30 702/151 |
| 2013/0240719 A1* | 9/2013 | Sato | ......................... | G01D 5/34 250/231.14 |

(Continued)

FOREIGN PATENT DOCUMENTS

| | | |
|---|---|---|
| CN | 1720189 A | 1/2006 |
| EP | 1 621 507 A1 | 2/2006 |
| JP | 2015-059014 A | 3/2015 |

OTHER PUBLICATIONS

Espacenet machine translation, Kondo Takeharu, Elevator Apparatus, WO2006106574 A1, Oct. 12, 2006 (Year: 2006).*

(Continued)

*Primary Examiner* — Eman A Alkafawi
*Assistant Examiner* — Denise R Karavias
(74) *Attorney, Agent, or Firm* — Eckert Seamans Cherin & Mellott, LLC

(57) ABSTRACT

The present invention provides an elevator encoder diagnostic system and an elevator encoder diagnostic method by which input and output ports are kept from being occupied, functional restriction is suppressed, and abnormalities and malfunctions occurring in encoders provided in a dual-system can be detected. The elevator encoder diagnostic system according to the present invention includes a first encoder 16a and a second encoder 16b that are provided on a rotary portion of the elevator, a first diagnostic unit 21a connected to the first encoder, and a second diagnostic unit 21b connected to the second encoder, a first determination unit 23a and a second determination unit 23b that detect differences between encoder rotation amounts of the respective encoder systems and rotation detection signals of the other encoder systems, and, if a difference therebetween exceeds a predetermined threshold, determines that an abnormality has occurred.

4 Claims, 3 Drawing Sheets

(56) References Cited

U.S. PATENT DOCUMENTS

2015/0142377 A1\* 5/2015 Kishida .................. G01B 7/30
702/151

OTHER PUBLICATIONS

Espacenet machine translation, Hoshino Takamichi, Elevator System, JP2016020246A, Feb. 4, 2016 (Year: 2016).\*
Swaroop, What is Serial Communication and How it works?, Codrey Electronics, Nov. 25, 2018, downloaded from internet from [https://www.codrey.com/embedded-systems/serial-communication-basics/ ] (Year: 2018).\*
China National Intellectual Property Administration, Office Action for Chinese patent application No. 2019109421511 corresponding to the subject U.S. application, issued Oct. 9, 2021, 6 pp.; English language translation also attached, 8 pp.

\* cited by examiner

ELEVATOR ENCODER DIAGNOSTIC SYSTEM AND DIAGNOSTIC METHOD

BACKGROUND OF THE INVENTION

1. Field of the Invention

The present invention relates to an elevator encoder diagnostic system and diagnostic method by which abnormalities of an encoder provided on a rotary portion of an elevator hoisting device, a speed governor, or the like can be detected.

2. Description of Related Art

A rotary portion of an elevator hoisting device, a speed governor, or the like is provided with an encoder, and the hoisting device is controlled, the amount of movement, speed, position, and the like of a car are calculated, and various types of control such as detection of the distance between the car and the upper and lower ends of an elevator shaft, and deceleration stop (ETS: Emergency Terminal Slowdown), and the like are performed based on pulse signals of the encoder. These controls are related to the safety of elevator operations, and thus it is important to detect redundancy (safety ensured by redundancy), abnormalities, and malfunctions, and there is a demand for providing encoders in a dual-system to ensure safety.

JP 2015-59014A discloses that pulse signals are input to a diagnostic unit from a first encoder and a second encoder, which are provided in a dual-system, and these input values are compared with each other, and thus abnormalities and malfunctions of the encoders provided in the dual-system can be detected at an early stage, for example.

SUMMARY OF THE INVENTION

However, even if encoders are provided in a dual-system, there is only one microcontroller that receives pulse signals from the two encoders in a diagnostic unit, and thus, if an abnormality occurs in the microcontroller, an abnormality or malfunction occurring in an encoder cannot be detected.

In view of this, although providing encoders in a dual-system is conceivable, at least one microcontroller needs to have two functions of processing input made by the encoders, which results in an increase in cost. Also, the function of processing input made by the two encoders is required, and thus a function that is exclusive to these functions can no longer be used, which results in a decrease in the degree of design freedom. Also, there is a problem in that input and output ports of the microcontroller are occupied by the two encoders provided in the dual-system, and cannot be used to receive and output other signals.

An object of the present invention is to provide an elevator encoder diagnostic system and an elevator encoder diagnostic method by which input and output ports are kept from being occupied, functional restriction is suppressed, and abnormalities and malfunctions of the encoders provided in the dual-system can be detected.

An elevator encoder diagnostic system according to the present invention includes:
a first encoder and a second encoder that are provided on a rotary portion of an elevator;
a first diagnostic unit connected to the first encoder; and
a second diagnostic unit connected to the second encoder,
wherein the first diagnostic unit includes a first encoder driver configured to receive a pulse signal from the first encoder, convert the pulse signal into a first encoder rotation amount, output the first encoder rotation amount, generate a first rotation detection signal from the first encoder rotation amount, and output the first rotation detection signal, the second diagnostic unit includes a second encoder driver configured to receive a pulse signal from the second encoder, convert the pulse signal into a second encoder rotation amount, output the second encoder rotation amount, generate a second rotation detection signal from the second encoder rotation amount, and output the second rotation detection signal, the first diagnostic unit includes a first determination unit configured to detect a difference between the first encoder rotation amount and the second rotation detection signal output from the second encoder driver, and, in a case where the difference exceeds a predetermined threshold, determine that an abnormality has occurred, and the second diagnostic unit includes a second determination unit configured to detect a difference between the second encoder rotation amount and the first rotation detection signal output from the first encoder driver, and, in a case where the difference exceeds a predetermined threshold, determine that an abnormality has occurred.

The first rotation detection signal may be transmitted to the second determination unit of the second diagnostic unit through serial communication, and the second rotation detection signal may be transmitted to the first determination unit of the first diagnostic unit through serial communication.

The first rotation detection signal may be a first forward rotation detection signal or a first reverse rotation detection signal that includes a rotation direction of the first encoder, and the second rotation detection signal may be a second forward rotation detection signal or a second reverse rotation detection signal that includes a rotation direction of the second encoder.

The first diagnostic unit may be configured such that the second forward rotation detection signal or the second reverse rotation detection signal is input to the first determination unit, and a logical sum of the second forward rotation detection signal and the second reverse rotation detection signal is input to the first determination unit, and the second diagnostic unit may be configured such that the first forward rotation detection signal or the first reverse rotation detection signal is input to the second determination unit, and a logical sum of the first forward rotation detection signal and the first reverse rotation detection signal is input to the second determination unit.

Also, an elevator encoder diagnostic method according to the present invention is an elevator encoder diagnostic method, the elevator including
a first encoder and a second encoder that are provided on a rotary portion of the elevator,
a first diagnostic unit connected to the first encoder, and
a second diagnostic unit connected to the second encoder,
the method including:
receiving a pulse signal from the first encoder, converting the pulse signal into a first encoder rotation amount, outputting the first encoder rotation amount, generating a first rotation detection signal from the first encoder rotation amount, and outputting the first rotation detection signal, by the first diagnostic unit;
receiving a pulse signal from the second encoder, converting the pulse signal into a second encoder rotation amount, outputting the second encoder rotation amount, generating a second rotation detection signal from the second encoder rotation amount, and outputting the second rotation detection signal, by the second diagnostic unit;

detecting a difference between the first encoder rotation amount and the second rotation detection signal output from the second diagnostic unit, and, in a case where the difference exceeds a predetermined threshold, determining that an abnormality has occurred, by the first diagnostic unit; and detecting a difference between the second encoder rotation amount and the first rotation detection signal output from the first diagnostic unit, and, in a case where the difference exceeds a predetermined threshold, determining that an abnormality has occurred, by the second diagnostic unit.

According to the elevator encoder diagnostic system of the present invention, as a result of providing encoders in a dual-system constituted by the first encoder and the second encoder, and making the diagnostic unit redundant by making it into a dual-system constituted by the first diagnostic unit and the second diagnostic unit, safety can be ensured even if an abnormality or a malfunction occurs in any portion thereof.

In particular, encoder drivers of the diagnostic units need only process a pulse signal from one encoder, and thus an encoder driver with little processing power can be adopted as an encoder driver, preventing an increase in cost. Also, the diagnostic units need only have the function of processing input from one encoder, and thus a function that is exclusive to this function can be used, thus increasing the degree of design freedom. Also, only one encoder system requires an input and output port for a diagnostic unit that receives signals input by encoders, and other input and output ports can be used to receive and output another signal.

DETAILED DESCRIPTION OF THE INVENTION

An elevator encoder diagnostic system and an elevator encoder diagnostic method according to embodiments of the present invention will be described with reference to the drawings.

Figure 1:
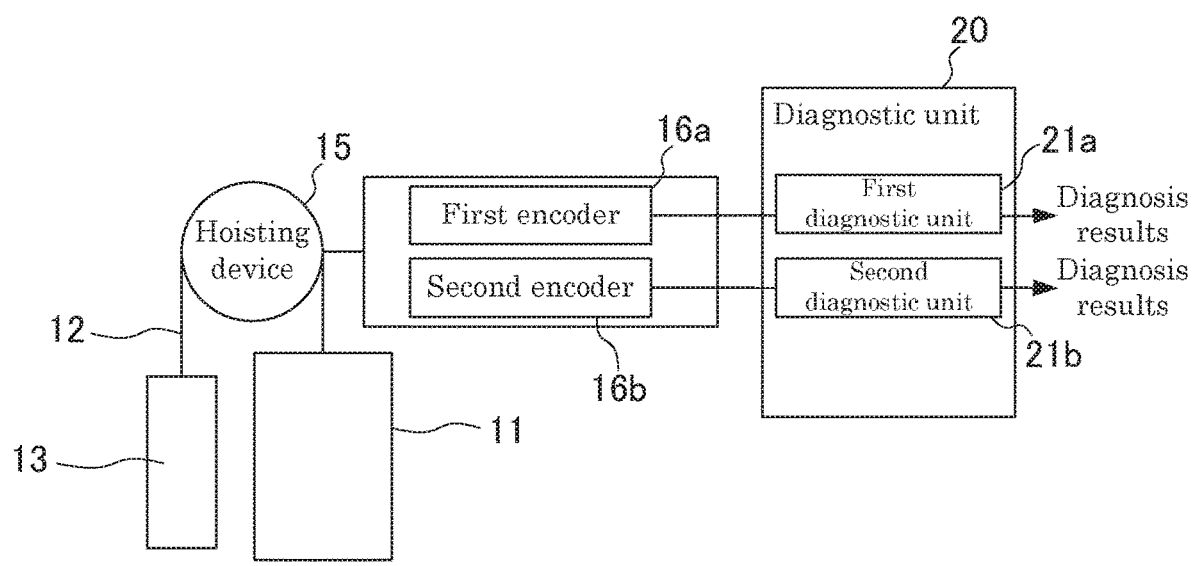
FIG. 1 is a block diagram of an elevator.

FIG. 1 is a block diagram showing the overall configuration of an elevator to which the elevator encoder diagnostic system and the elevator encoder diagnostic method according to the present invention are applied. As shown in FIG. 1, in the elevator, a car 11 is suspended from an end of a main rope 12, and a counterweight 13 is suspended from the other end of the main rope 12. The main rope 12 is hung on a sheave provided coaxially with a hoisting device 15, and raises and lowers the car 11 in a shaft through forward and reverse rotation by the hoisting device 15. Encoders 16a and 16b provided in the dual-system are attached to the hoisting device 15, and the encoders 16a and 16b output pulse signals generated in response to rotation of the hoisting device 15. In usual operation, the pulse signals output from the encoders 16a and 16b are input to an operation control unit (not shown) of the elevator, and are used to control the hoisting device 15 for raising and lowering the car 11. Note that, although the encoders 16a and 16b can be provided on the hoisting device 15 as rotary portions, a configuration thereof is not limited thereto, and the encoders 16a and 16b may be disposed on another rotary portion of a governor of an ETS apparatus, a tension pulley that is suspended from the governor by a rope (these members are not shown), or the like.

With the present invention, the encoders are provided in a dual-system including a first system and a second system (the first encoder 16a and the second encoder 16b), and as shown in FIG. 1, pulse signals of the encoders 16a and 16b are input to a diagnostic unit 20. The diagnostic unit 20 includes diagnostic units (a first diagnostic unit 21a and a second diagnostic unit 21b) provided in a dual-system, and a pulse signal of either the encoder 16a or the encoder 16b is input to the diagnostic units 21a and 21b. Encoders that output 2-phase pulse signal trains including phase A and phase B that have a phase difference of a predetermined period (e.g., a ¼ period) can be used as the encoders 16a and 16b.

In this embodiment, the first diagnostic unit 21a receives pulse signals input by the first encoder 16a. Also, the second diagnostic unit 21b receives pulse signals input by the second encoder 16b. A detailed functional block diagram of the first diagnostic unit 21a and the second diagnostic unit 21b is shown in FIG. 2.

Figure 2:
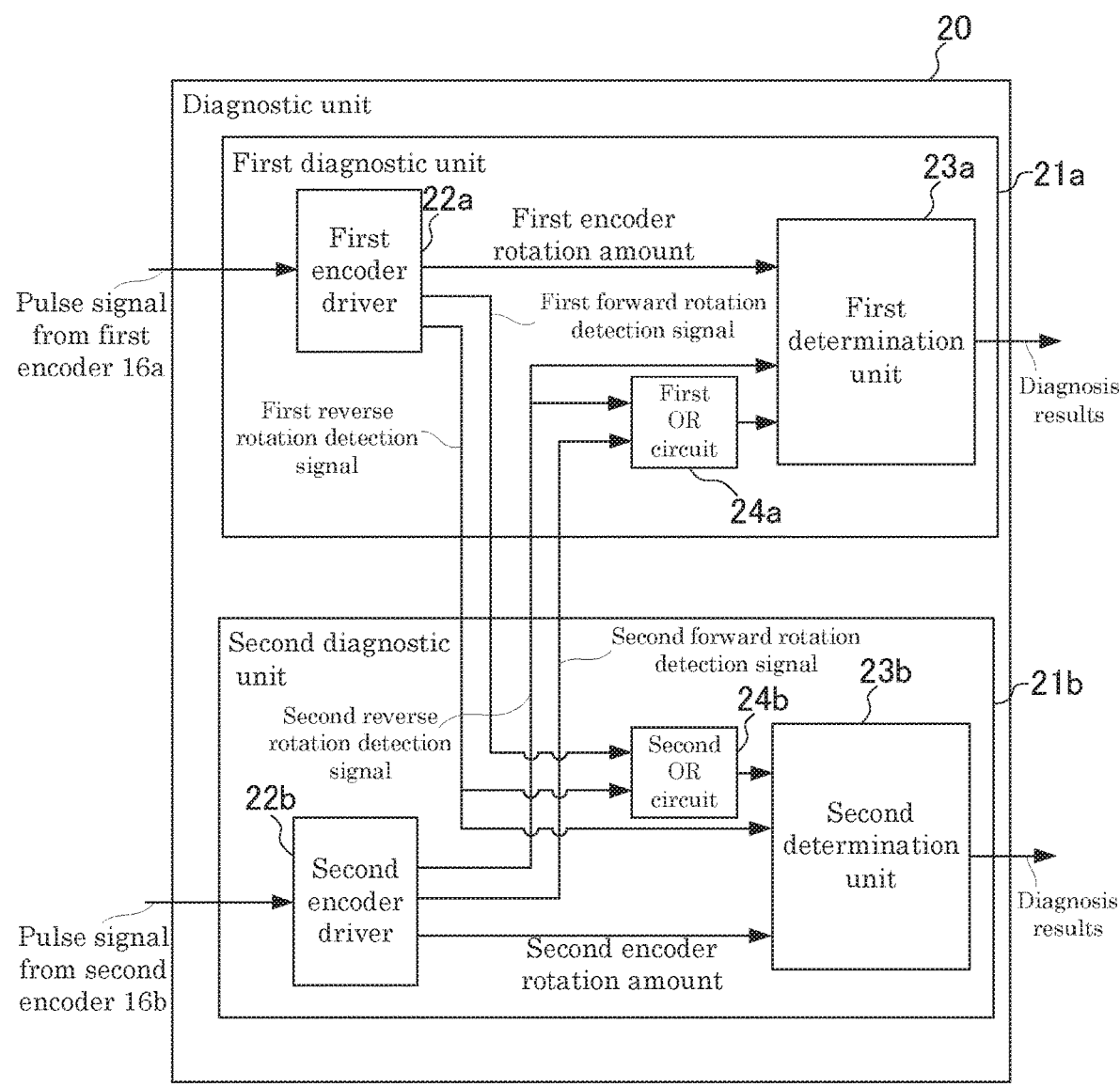
FIG. 2 is a block diagram of an encoder diagnostic system according to an embodiment of the present invention.

As shown in FIG. 2, the first diagnostic unit 21a may be constituted by a microcontroller, for example, and the first diagnostic unit 21a includes a first encoder driver 22a that receives pulse signals input by the first encoder 16a, and a first determination unit 23a. The first encoder driver 22a counts 2-phase pulse signals including phase A and phase B received from the first encoder 16a, and converts the pulse signals into a count value acting as the first encoder rotation amount. Also, a first rotation detection signal (the first forward rotation detection signal or the first reverse rotation detection signal) that includes a rotation detection signal and the direction of rotation thereof (forward rotation or reverse rotation) is generated from the phase difference between phases A and B that are included in the 2-phase pulse signals. The count value is added in the case of forward rotation, and is subtracted in the case of reverse rotation.

The first encoder driver 22a outputs the generated first encoder rotation amount and the first rotation detection signal (the first forward rotation detection signal or the first reverse rotation detection signal). The first encoder rotation amount is output to the first determination unit 23a, and the first rotation detection signal (the first forward rotation detection signal or the first reverse rotation detection signal) is output to the second diagnostic unit 21b through serial communication, for example.

The second diagnostic unit 21b may also be constituted by a microcontroller, for example, and the second diagnostic unit 21b also includes a second encoder driver 22b that receives pulse signals input by the second encoder 16b, and a second determination unit 23b. The second encoder driver 22b counts 2-phase pulse signals including phase A and phase B received from the second encoder 16b, and converts the pulse signals into a count value acting as the second encoder rotation amount. Also, a second rotation detection signal (the second forward rotation detection signal or the second reverse rotation detection signal) that includes a rotation detection signal and the direction of rotation thereof (forward rotation or reverse rotation) is generated from the phase difference between phases A and B that are included in the 2-phase pulse signals. The count value is added in the case of forward rotation, and is subtracted in the case of reverse rotation.

The second encoder driver 22b outputs the generated second encoder rotation amount and the second rotation detection signal (the second forward rotation detection signal or the second reverse rotation detection signal). The second encoder rotation amount is output to the second determination unit 23b, and the second rotation detection signal (the second forward rotation detection signal or the second reverse rotation detection signal) is output to the first diagnostic unit 21a through serial communication, for example.

In the first diagnostic unit 21a, the first determination unit 23a determines whether an abnormality has occurred in the encoders 16a and 16b based on the above-described first encoder rotation amount output from the first encoder driver 22a and the second rotation detection signal (the second forward rotation detection signal or the second reverse rotation detection signal) output from the second encoder driver 22b of the second diagnostic unit 21b. Specifically, the first diagnostic unit 21a applies, as a standard value, the second forward rotation detection signal that is a detection signal of forward rotation, or the second reverse rotation detection signal that is a detection signal of reverse rotation according to whether the second rotation detection signal is the second forward rotation detection signal or the second reverse rotation detection signal, detects a difference (shift) between the first encoder rotation amount and the second rotation detection signal, and, in a case where this difference is in an allowable range that includes a predetermined threshold, determines that the encoders 16a and 16b are normal, and in a case where the difference exceeds the predetermined threshold, determines that an abnormality has occurred in one or both of the encoders 16a and 16b.

The second rotation detection signal (the second forward rotation detection signal or the second reverse rotation detection signal) can be input to the first determination unit 23a by directly inputting any one of the signals (the second reverse rotation detection signal in this embodiment) to the first determination unit 23a, and inputting the second forward rotation detection signal and the second reverse rotation detection signal to a first OR circuit 24a and outputting the logical sum thereof thereto. Accordingly, the first determination unit 23a can obtain the pulse of the second rotation detection signal and the rotation direction thereof, and can make a comparison with the first encoder rotation amount.

In the second diagnostic unit 21b, the second determination unit 23b also determines whether an abnormality has occurred in the encoders 16a and 16b based on the above-described second encoder rotation amount output from the second encoder driver 22b and the first rotation detection signal (the first forward rotation detection signal or the first reverse rotation detection signal) output from the first encoder driver 22a of the first diagnostic unit 21a. Specifically, the second diagnostic unit 21b applies, as a standard value, the first forward rotation detection signal that is a detection signal of forward rotation, or the first reverse rotation detection signal that is a detection signal of reverse rotation according to whether the first rotation detection signal is the first forward rotation detection signal or the first reverse rotation detection signal, detects a difference between the second encoder rotation amount and the first rotation detection signal, and, in a case where this difference is in an allowable range that includes a predetermined threshold, determines that the encoders 16a and 16b are normal, and, in a case where the difference exceeds the predetermined threshold, determines that an abnormality has occurred in one or both of the encoders 16a and 16b.

The first rotation detection signal (the first forward rotation detection signal or the first reverse rotation detection signal) can be input to the second determination unit 23b by directly inputting any one of the signals (the first reverse rotation detection signal in this embodiment) to the second determination unit 23b, and inputting the first forward rotation detection signal and the first reverse rotation detection signal to a second OR circuit 24b and outputting the logical sum thereof thereto. Accordingly, the second determination unit 23b can obtain the pulse of the first rotation detection signal and the rotation direction thereof, and can make a comparison with the second encoder rotation amount.

If the first determination unit 23a and second determination unit 23b determine that no abnormality has occurred in either of the encoders 16a and 16b, the first determination unit 23a and the second determination unit 23b need only transmit the diagnosis results to an elevator operation control unit, for example. On the other hand, if the first determination unit 23a and/or the second determination unit 23b determines that an abnormality has occurred in the encoders 16a and 16b, it is highly likely that an abnormality has occurred in the encoders 16a and 16b or an elevator control system, and thus, the car 11 needs to be urgently stopped at the nearest floor, and the elevator needs to be forcibly stopped and a notification needs to be issued by a notification means (not shown) to the elevator management room or remote control station.

Figure 3:
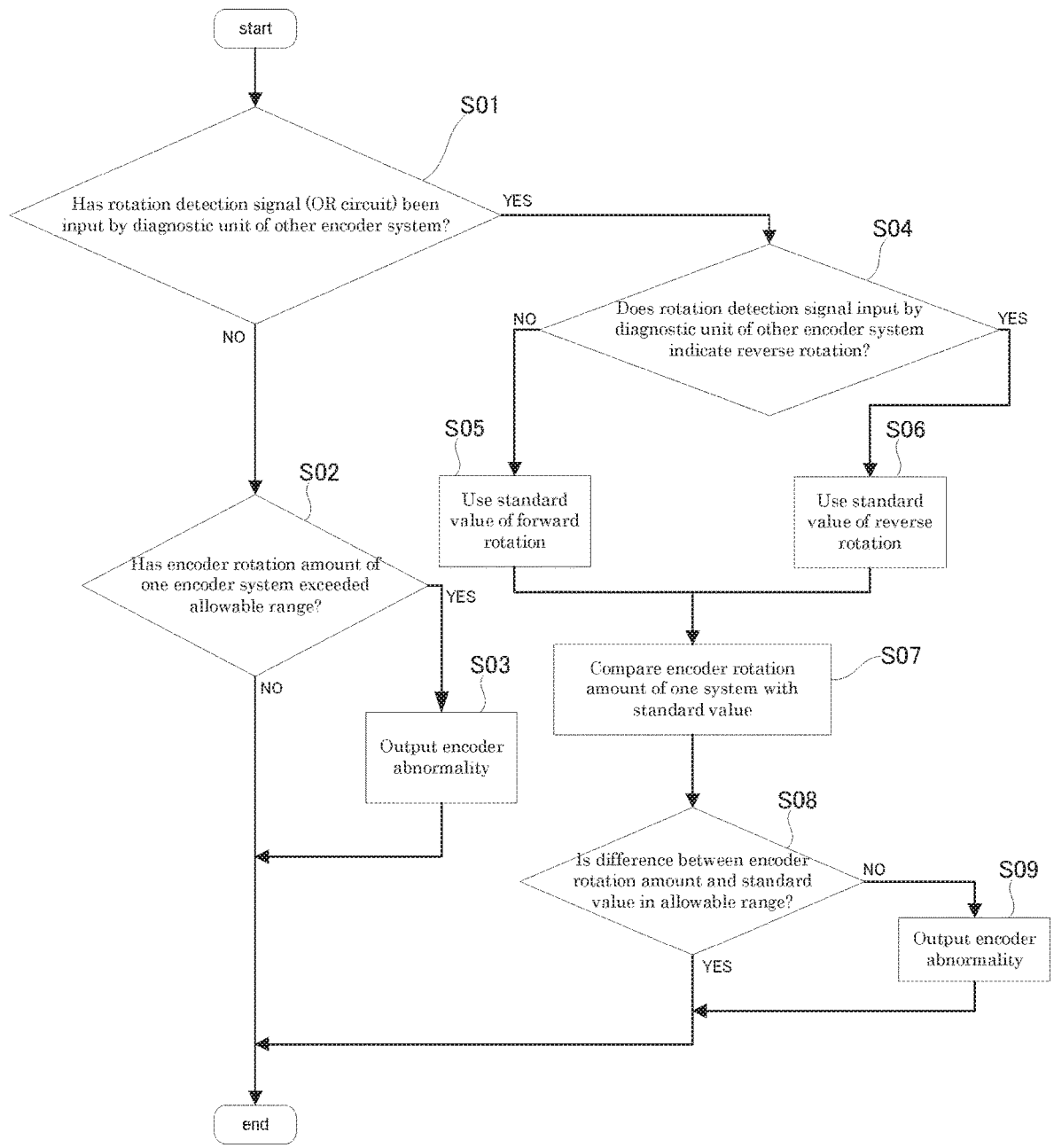
FIG. 3 is a flowchart of an encoder diagnostic method according to an embodiment of the present invention.

FIG. 3 shows a flowchart for controlling the elevator encoder diagnostic system shown in FIGS. 1 and 2.

The first diagnostic unit 21a and the second diagnostic unit 21b respectively execute diagnosis of the encoders 16a and 16b based on the flowchart shown in FIG. 3. Note that, although the flow of diagnosis in the first diagnostic unit 21a will be described hereinafter, the same diagnosis flow is executed for the second diagnostic unit 21b. With regard to the second diagnostic unit 21b, the first need only be read as the second, and the second need only be read as the first.

When diagnosis of the encoders 16a and 16b is started, a pulse signal of the first encoder 16a is input to the first diagnostic unit 21a, a pulse signal of the second encoder 16b is input to the second diagnostic unit 21b, and the encoder drivers 22a and 22b respectively count the encoder rotation amounts and generate rotation detection signals. The encoder rotation amounts are transmitted to the determination units 23a and 23b of the respective encoder systems, and the rotation detection signals are transmitted to the respective diagnostic units 21a and 21b of the other encoder systems.

The first determination unit 23a of the first diagnostic unit 21a first waits for the second rotation detection signal (the second forward rotation detection signal or the second reverse rotation detection signal) to be input by the second diagnostic unit 21b, which is in the other encoder system (Step S01). If the second rotation detection signal is not input by the second diagnostic unit 21b (NO in step S01), a determination is made as to whether the first encoder rotation amount input by the first encoder driver 22a, which is in the one encoder system, exceeds an allowable range (step S02). When the first encoder rotation amount of the first encoder system is not input to the first determination unit 23a (NO in step S02), the diagnosis is ended because pulse signals are not output from the encoders 16a and 16b because a rotary portion of a hoisting device or the like is not rotating (operating), or the rotary portion is not rotating sufficient to generate a rotation detection signal, and thus no abnormality has occurred in the encoders 16a and 16b. On the other hand, if a rotation amount that exceeds the allowable range is detected by the first encoder driver 22a in the first encoder system without the second rotation detection signal being input by the second diagnostic unit 21b, which is in the other encoder system (YES in step S02), the first determination unit 23a determines that an abnormality has occurred in either of the encoders 16a and 16b, and outputs an encoder abnormality to end the diagnosis (step S03). Note that, if diagnosis reveals an abnormality, it is highly likely that an abnormality has occurred in the encoders 16a and 16b or the elevator control system, and thus, the car 11 needs to be urgently stopped at the nearest floor, and the elevator needs to be forcibly stopped and a notification needs to be issued by a notification means (not shown) to the elevator management room or remote control station.

On the other hand, in step S01, if the second rotation detection signal is input by the second diagnostic unit 21b, which is in the other encoder system, to the first determination unit 23a (YES in step S01), a determination is made as to whether the second rotation detection signal is the second forward rotation detection signal or the second reverse rotation detection signal (step S04). In this embodiment, as shown in FIG. 2, with regard to the second rotation detection signal that is input to the first determination unit 23a, the second forward rotation detection signal is input via the first OR circuit 24a, and the second reverse rotation detection signal is directly input to the first determination unit 23a and the logical sum thereof is output by the first OR circuit 24a. Specifically, with regard to the rotation direction of the second rotation detection signal input by the second diagnostic unit 21b and the presence or absence of rotation, as shown in Table 1 below, if no second reverse rotation detection signal is input and a signal is input by the first OR circuit 24a, the first determination unit 23a determines that the rotation direction is the forward rotation and that rotation has occurred (NO in step S04). On the other hand, if the second reverse rotation detection signal is directly input and a signal is also input by the first OR circuit 24a, it is determined that the rotation direction is the reverse rotation and that rotation has occurred (YES in step S04).

TABLE 1

| OR circuit | Reverse rotation | |
| --- | --- | --- |
| | Input is made | Input is not made |
| Input is made | ¼ reverse rotation | ¼ forward rotation |
| Input is not made | | no ¼ rotation |

Based on the rotation direction, if the second rotation detection signal indicates forward rotation, the first diagnostic unit 21a uses a standard value of forward rotation (the second forward rotation detection signal: NO in step S04, step S05) with regard to the standard value used in diagnosis (step S07), and, if the second rotation detection signal indicates reverse rotation, uses a standard value of reverse rotation (the second reverse rotation detection signal: YES in step S04, step S06) with regard to the standard value used in diagnosis (step S07) (the second reverse rotation detection signal).

Also, in the subsequent step S07, the first determination unit 23a adopts the standard value obtained in step S05 or step S06 (the second forward rotation detection signal or the second reverse rotation detection signal), and compares this standard value with the first encoder rotation amount of the first encoder system, which is the first encoder system. As a result, a difference (shift) between the first encoder rotation amount and the adopted standard value is detected, and if this difference is in an allowable range, which includes a predetermined threshold, it is determined that the encoders 16a and 16b are normal because no abnormality has occurred in the encoders 16a and 16b, and the diagnosis is ended (YES in step S08). On the other hand, if the difference therebetween exceeds the predetermined threshold, it is determined that an abnormality has occurred in one or both of the encoders 16a and 16b (NO in step S08), an encoder abnormality is output, and the diagnosis is ended (step S09). Note that, if diagnosis reveals an abnormality, it is highly likely that an abnormality has occurred in the encoders 16a and 16b or the elevator control system, and thus, the car 11 needs to be urgently stopped at the nearest floor, and the elevator needs to be forcibly stopped and a notification needs to be issued by a notification means (not shown) to the elevator management room or remote control station.

According to the above-described elevator encoder diagnostic system and diagnostic method, as a result of providing encoders in a dual-system constituted by the first encoder 16a and the second encoder 16b, and making the diagnostic unit 20 redundant into a dual-system constituted by the first diagnostic unit 21a and the second diagnostic unit 21b, safety can be ensured even if an abnormality or malfunction occurs in any portion.

Also, a microcontroller with little processing power can be adopted as the encoder drivers 22a and 22b of the diagnostic units 21a and 21b because it is sufficient to be able to process a pulse signal of either of the encoders 16a and 16b, and thus the cost can be reduced. Also, the diagnostic units 21a and 21b need only have the function of processing input made by the encoder 16a or 16b, and thus a function that is exclusive to this function can be used, increasing the degree of design freedom. Also, input and output ports of the diagnostic units 21a and 21b that receive signals input by the encoders 16a and 16b are required for only one encoder system, and the other input and output ports can be used to receive and output other signals.

The above description is given merely to describe the present invention, and should not be interpreted as limiting the invention recited in the appended claims or narrowing the scope of the invention. Also, the constituent elements of the present invention are not limited to those described in the examples above, and it is of course possible to make various modifications within the technical scope of the claims.

What is claimed is:
1. An elevator encoder diagnostic system comprising:
    a first encoder and a second encoder that are provided on a rotary portion of an elevator;
    a first microcontroller connected to the first encoder; and
    a second microcontroller connected to the second encoder, wherein the first microcontroller includes a first encoder driver configured to receive a pulse signal from the first encoder, convert the pulse signal into a first encoder rotation amount, output the first encoder rotation amount, generate from the first encoder rotation amount a first rotation detection signal including a first forward rotation detection signal that is a value obtained by counting up the pulse signal of the first encoder from zero when the first encoder rotates in forward direction, and a first reverse rotation detection signal that is a value obtained by counting down the pulse signal of the first encoder from zero when the first encoder rotates in reverse rotation, and output the first rotation detection signal, wherein the first encoder rotation amount is output to the first microprocessor and the first rotation detection signal is output to the second microcontroller through serial communication, the second microcontroller includes a second encoder driver configured to receive a pulse signal from the second encoder, convert the pulse signal into a second encoder rotation amount, output the second encoder rotation amount, generate from the second encoder rotation amount a second rotation detection signal including a second forward rotation detection signal that is a value obtained by counting up the pulse signal of the second encoder from zero when the second encoder rotates in forward rotation and a second reverse rotation detection signal that is a value obtained by counting down the pulse signal of the second encoder from zero when the second encoder rotates in reverse rotation, and output the second rotation detection signal, wherein the second encoder rotation amount is output to the second microprocessor and the second rotation detection signal is output to the first microcontroller through serial communication, the first microcontroller further includes a first microprocessor configured to detect a difference between the first encoder rotation amount and the second rotation detection signal output from the second encoder driver and to diagnose as normal if the difference is within a predetermined threshold and to diagnose as abnormal if the difference exceeds the predetermined threshold, wherein the threshold has a forward rotation value that is applied when the second rotation detection signal is the second forward rotation detection signal, and a reverse rotation value that is applied when the second rotation detection signal is the second reverse rotation detection signal, and a first OR circuit configured to receive the second forward rotation detection signal and the second reverse rotation detection signal and to output a logical sum of the second forward and reverse rotation detection signals to the first microprocessor, wherein the first microprocessor detects the difference between the first encoder rotation amount and the second reverse rotation detection signal, when there is an input of the second reverse rotation detection signal and an input of a logical sum of the second forward rotation signal and the second reverse rotation signal sent from the first OR circuit and applies the reverse rotation value as the threshold to compare the difference, or the first microprocessor detects the difference between the first encoder rotation amount and the second forward rotation detection signal, when there is no input of the second reverse rotation detection signal and also when there is an input of the logical sum of the second forward rotation signal and the second reverse rotation signal sent from the first OR circuit and applies the forward rotation value as the threshold to compare the difference, and, in a case where the difference exceeds a predetermined threshold, the first microprocessor determines that an abnormality has occurred, and the second microcontroller further includes a second microprocessor configured to detect a difference between the second encoder rotation amount and the first rotation detection signal output from the first encoder driver and to diagnose as normal if the difference is within a predetermined threshold and to diagnose as abnormal if the difference exceeds the predetermined threshold, wherein the threshold has a forward rotation value that is applied when the first rotation detection signal is the first forward rotation detection signal, and a reverse rotation value that is applied when the first rotation detection signal is the first reverse rotation detection signal, and a second OR circuit configured to receive the first forward rotation detection signal and the first reverse rotation detection signal and to output a logical sum of the first forward and reverse rotation detection signals to the second microprocessor, and the second microprocessor detects the difference between the second encoder rotation amount and the first reverse rotation detection signal, when there is an input of the first reverse rotation detection signal and an input of a logical sum of the first forward rotation signal and the first reverse rotation signal sent from the second OR circuit and applies the reverse rotation value as the threshold to compare the difference, or the second microprocessor detects the difference between the second encoder rotation amount and the first forward rotation detection signal, when there is no input of the first reverse rotation detection signal and also when there is an input of the logical sum of the first forward rotation signal and the first reverse rotation signal sent from the second OR circuit and applies the forward rotation value as the threshold to compare the difference, and, in a case where the difference exceeds a predetermined threshold, the second microprocessor determines that an abnormality has occurred.

2. An elevator encoder diagnostic method, an elevator including a first encoder and a second encoder that are provided on a rotary portion of the elevator, a first microcontroller connected to the first encoder, and a second microcontroller connected to the second encoder, the method comprising:

receiving a pulse signal from the first encoder, converting the pulse signal into a first encoder rotation amount, outputting the first encoder rotation amount, generating from the first encoder rotation amount a first rotation detection signal including a first forward rotation detection signal that is a value obtained by counting up the pulse signal of the first encoder from zero when the first encoder rotates in forward rotation and a first reverse rotation detection signal that is a value obtained by counting down the pulse signal of the first encoder from zero when the first encoder rotates in reverse rotation, and outputting the first rotation detection signal, by the first microcontroller, wherein the first encoder rotation amount is output to the first microprocessor and the first rotation detection signal is output to the second microcontroller through serial communication;

receiving a pulse signal from the second encoder, converting the pulse signal into a second encoder rotation amount, outputting the second encoder rotation amount, generating from the second encoder rotation amount a second rotation detection signal including a second forward rotation detection signal that is a value obtained by counting up the pulse signal of the second encoder from zero when the second encoder rotates in forward rotation and a second reverse rotation detection signal that is a value obtained by counting down the pulse signal of the second encoder from zero when the second encoder rotates in reverse rotation, and outputting the second rotation detection signal, by the second microcontroller, wherein the second encoder rotation amount is output to the second microprocessor and the second rotation detection signal is output to the first microcontroller through serial communication;

detecting a difference between the first encoder rotation amount and the second rotation detection signal output from the second microcontroller by the first microcontroller, wherein the first microcontroller is configured to diagnose as normal if the difference is within a predetermined threshold and to diagnose as abnormal if the difference exceeds the predetermined threshold, wherein the threshold has a forward rotation value that is applied when the second rotation detection signal is the second forward rotation detection signal, and a reverse rotation value that is applied when the second rotation detection signal is the second reverse rotation detection signal, wherein the first microcontroller detects the difference between the first encoder rotation amount and the second reverse rotation detection signal, when there is an input of the second reverse rotation detection signal and an input of a logical sum of the second forward rotation signal and the second reverse rotation signal and applies the reverse rotation value as the threshold to compare the difference, or the first microcontroller detects the difference between the first encoder rotation amount and the second forward rotation detection signal, when there is no input of the second reverse rotation detection signal and also when there is an input of the logical sum of the second forward rotation signal and the second reverse rotation signal and applies the forward rotation value as the threshold to compare the difference, and in a case where the difference exceeds a predetermined threshold, the first microcontroller determines that an abnormality has occurred; and detecting a difference between the second encoder rotation amount and the first rotation detection signal output from the first microcontroller by the second microcontroller, wherein the second microcontroller is configured to diagnose as normal if the difference is within a predetermined threshold and to diagnose as abnormal if the difference exceeds the predetermined threshold, wherein the threshold has a forward rotation value that is applied when the first rotation detection signal is the first forward rotation detection signal, and a reverse rotation value that is applied when the first rotation detection signal is the first reverse rotation detection signal, wherein the second microcontroller detects the difference between the second encoder rotation amount and the first reverse rotation detection signal, when there is an input of the first reverse rotation detection signal and an input of a logical sum of the first forward rotation signal and the first reverse rotation signal, and applies the reverse rotation value as the threshold to compare the difference or the second microcontroller detects the difference between the second encoder rotation amount and the first forward rotation detection signal, when there is no input of the first reverse rotation detection signal and also when there is an input of the logical sum of the first forward rotation signal and the first reverse rotation signal and applies the forward rotation value as the threshold to compare the difference, and, in a case where the difference exceeds a predetermined threshold, the second microcontroller determines that an abnormality has occurred, by the second microcontroller.

3. An elevator encoder diagnostic system comprising:

a first encoder and a second encoder that are provided on a rotary portion of an elevator;

a first microcontroller connected to the first encoder; and a second microcontroller connected to the second encoder, wherein the first microcontroller includes a first encoder driver configured to receive a pulse signal from the first encoder, convert the pulse signal into a first encoder rotation amount, output the first encoder rotation amount, generate from the first encoder rotation amount a first rotation detection signal including a first forward rotation detection signal that is a value obtained by counting up the pulse signal of the first encoder from zero when the first encoder rotates in forward rotation and a first reverse rotation detection signal that is a value obtained by counting down the pulse signal of the first encoder from zero when the first encoder rotates in reverse rotation, and output the first rotation detection signal, wherein the first encoder rotation amount is output to the first microprocessor and the first rotation detection signal is output to the second microcontroller through serial communication, the second microcontroller includes a second encoder driver configured to receive a pulse signal from the second encoder, convert the pulse signal into a second encoder rotation amount, output the second encoder rotation amount, generate from the second encoder rotation amount a second rotation detection signal including a second forward rotation detection signal that is a value obtained by counting up the pulse signal of the second encoder from zero when the second encoder rotates in forward rotation and a second reverse rotation detection signal that is a value obtained by counting down the pulse signal of the second encoder from zero when the second encoder rotates in reverse rotation, and output the second rotation detection signal, wherein the second encoder rotation amount is output to the second microprocessor and the second rotation detection signal is output to the first microcontroller through serial communication, the first microcontroller further includes a first microprocessor configured to detect a difference between the first encoder rotation amount and the second rotation detection signal output from the second encoder driver and to diagnose as normal if the difference is within a predetermined threshold and to diagnose as abnormal if the difference exceeds the predetermined threshold, wherein the threshold has a forward rotation value that is applied when the second rotation detection signal is the second forward rotation detection signal, and a reverse rotation value that is applied when the second rotation detection signal is the second reverse rotation detection signal, and a first OR circuit configured to receive the second forward rotation detection signal and the second reverse rotation detection signal and to output a logical sum of the second forward and reverse rotation detection signals to the first microprocessor, wherein the first microprocessor detects the difference between the first encoder rotation amount and the second forward rotation detection signal, when there is an input of the second forward rotation detection signal and an input of a logical sum of the second forward rotation signal and the second reverse rotation signal sent from the first OR circuit and applies the forward rotation value as the threshold to compare the difference, or the first microprocessor detects the difference between the first encoder rotation amount and the second reverse rotation detection signal, when there is no input of the second forward rotation detection signal and also when there is an input of the logical sum of the second forward rotation signal and the second reverse rotation signal sent from the first OR circuit and applies the reverse rotation value as the threshold to compare the difference, and, in a case where the difference exceeds a predetermined threshold, the first microprocessor determines that an abnormality has occurred, and the second microcontroller further includes a second microprocessor configured to detect a difference between the second encoder rotation amount and the first rotation detection signal output from the first encoder driver and to diagnose as normal if the difference is within a predetermined threshold and to diagnose as abnormal if the difference exceeds the predetermined threshold, wherein the threshold has a forward rotation value that is applied when the first rotation detection signal is the first forward rotation detection signal, and a reverse rotation value that is applied when the first rotation detection signal is the first reverse rotation detection signal, and a second OR circuit configured to receive the first forward rotation detection signal and the first reverse rotation detection signal and to output a logical sum of the first forward and reverse rotation detection signals to the second microprocessor, and the second microprocessor detects the difference between the second encoder rotation amount and the first forward rotation detection signal, when there is an input of the first forward rotation detection signal and an input of a logical sum of the first forward rotation signal and the first reverse rotation signal sent from the second OR circuit and applies the forward rotation value as the threshold to compare the difference, or the second microprocessor detects the difference between the second encoder rotation amount and the first reverse rotation detection signal, when there is no input of the first forward rotation detection signal and also when there is an input of the logical sum of the first forward rotation signal and the first reverse rotation signal sent from the second OR circuit and applies the reverse rotation value as the threshold to compare the difference, and, in a case where the difference exceeds a predetermined threshold, the second microprocessor determines that an abnormality has occurred.

4. An elevator encoder diagnostic method, an elevator including a first encoder and a second encoder that are provided on a rotary portion of the elevator, a first microcontroller connected to the first encoder, and a second microcontroller connected to the second encoder, the method comprising:

receiving a pulse signal from the first encoder, converting the pulse signal into a first encoder rotation amount, outputting the first encoder rotation amount, generating from the first encoder rotation amount a first rotation detection signal including a first forward rotation detection signal that is a value obtained by counting up the pulse signal of the first encoder from zero when the first encoder rotates in forward rotation and a first reverse rotation detection signal that is a value obtained by counting down the pulse signal of the first encoder from zero when the first encoder rotates in reverse rotation, and outputting the first rotation detection signal, by the first microcontroller, wherein the first encoder rotation amount is output to the first microprocessor and the first rotation detection signal is output to the second microcontroller through serial communication;

receiving a pulse signal from the second encoder, converting the pulse signal into a second encoder rotation amount, outputting the second encoder rotation amount, generating from the second encoder rotation amount a second rotation detection signal including a second forward rotation detection signal that is a value obtained by counting up the pulse signal of the second encoder from zero when the second encoder rotates in forward rotation and a second reverse rotation detection signal that is a value obtained by counting down the pulse signal of the second encoder from zero when the second encoder rotates in reverse rotation, and outputting the second rotation detection signal, by the second microcontroller, wherein the second encoder rotation amount is output to the second microprocessor and the second rotation detection signal is output to the first microcontroller through serial communication;

detecting a difference between the first encoder rotation amount and the second rotation detection signal output from the second microcontroller by the first microcontroller, wherein the first microcontroller is configured to diagnose as normal if the difference is within a predetermined threshold and to diagnose as abnormal if the difference exceeds the predetermined threshold, wherein the threshold has a forward rotation value that is applied when the second rotation detection signal is the second forward rotation detection signal, and a reverse rotation value that is applied when the second rotation detection signal is the second reverse rotation detection signal, wherein the first microcontroller detects the difference between the first encoder rotation amount and the second forward rotation detection signal, when there is an input of the second forward rotation detection signal and an input of a logical sum of the second forward rotation signal and the second reverse rotation signal and applies the forward rotation value as the threshold to compare the difference, or the first microcontroller detects the difference between the first encoder rotation amount and the second reverse rotation detection signal, when there is no input of the second forward rotation detection signal and also when there is an input of the logical sum of the second forward rotation signal and the second reverse rotation signal and applies the reverse rotation value as the threshold to compare the difference, and in a case where the difference exceeds a predetermined threshold, the first microcontroller determines that an abnormality has occurred; and detecting a difference between the second encoder rotation amount and the first rotation detection signal output from the first microcontroller by the second microcontroller, wherein the second microcontroller is configured to diagnose as normal if the difference is within a predetermined threshold and to diagnose as abnormal if the difference exceeds the predetermined threshold, wherein the threshold has a forward rotation value that is applied when the first rotation detection signal is the first forward rotation detection signal, and a reverse rotation value that is applied when the first rotation detection signal is the first reverse rotation detection signal, wherein the second microcontroller detects the difference between the second encoder rotation amount and the first forward rotation detection signal, when there is an input of the first forward rotation detection signal and an input of a logical sum of the first forward rotation signal and the first reverse rotation signal and applies the forward rotation value as the threshold to compare the difference, or the second microcontroller detects the difference between the second encoder rotation amount and the first reverse rotation detection signal, when there is no input of the first forward rotation detection signal and also when there is an input of the logical sum of the first forward rotation signal and the first reverse rotation signal and applies the reverse rotation value as the threshold to compare the difference, and, in a case where the difference exceeds a predetermined threshold, the second microcontroller determines that an abnormality has occurred, by the second microcontroller.

* * * * *